United States Patent
McIntyre

(10) Patent No.: US 10,318,644 B1
(45) Date of Patent: Jun. 11, 2019

(54) DYNAMIC UPDATE OF TRANSLATIONS FOR ELECTRONIC RESOURCES

(71) Applicant: Coupa Software Incorporated, San Mateo, CA (US)

(72) Inventor: Aaron McIntyre, San Mateo, CA (US)

(73) Assignee: Coupa Software Incorporated, San Mateo, CA (US)

( * ) Notice: Subject to any disclaimer, the term of this patent is extended or adjusted under 35 U.S.C. 154(b) by 84 days.

(21) Appl. No.: 15/660,836

(22) Filed: Jul. 26, 2017

(51) Int. Cl.
*G06F 17/28* (2006.01)
*G06F 3/0488* (2013.01)
*G06F 16/2452* (2019.01)

(52) U.S. Cl.
CPC .......... *G06F 17/289* (2013.01); *G06F 3/0488* (2013.01); *G06F 16/24522* (2019.01)

(58) Field of Classification Search
CPC ................................................ G06F 17/289
USPC ................................................. 704/2
See application file for complete search history.

(56) References Cited

U.S. PATENT DOCUMENTS

| | | | |
|---|---|---|---|
| 6,092,036 A | 7/2000 | Hamann | |
| 6,623,526 B1* | 9/2003 | Lloyd | A61F 2/3868 623/20.28 |
| 7,103,875 B1 | 9/2006 | Kaneko | |
| 7,207,005 B2* | 4/2007 | Lakritz | G06F 17/2258 709/203 |
| 7,571,092 B1 | 8/2009 | Nieh | |
| 7,823,062 B2* | 10/2010 | Liberty | G06F 17/3089 715/234 |
| 8,489,980 B2* | 7/2013 | Lakritz | G06F 15/00 704/2 |
| 8,825,692 B1 | 9/2014 | Telnov | |
| 9,201,865 B2* | 12/2015 | Tran | G06F 17/2785 |
| 9,910,850 B2* | 3/2018 | Sakashita | G06F 17/2827 |
| 9,971,767 B1 | 5/2018 | Chang | |
| 2003/0115552 A1 | 6/2003 | Jahnke | |
| 2005/0240905 A1 | 10/2005 | Pournasseh | |
| 2006/0004738 A1 | 1/2006 | Blackwell | |
| 2006/0294463 A1 | 12/2006 | Chu | |
| 2007/0050757 A1 | 3/2007 | Van Woerkom | |
| 2007/0225966 A1 | 9/2007 | Suen | |
| 2008/0066057 A1 | 3/2008 | Aoyama | |

(Continued)

OTHER PUBLICATIONS

In-App Translator. Knowledge Base [online]. Translation Exchange, Inc., retrieved on May 16, 2016, http://docs.translationexchange.com/in-app-translator/, 9 pages.

(Continued)

*Primary Examiner* — Susan I McFadden
(74) *Attorney, Agent, or Firm* — Hickman Palermo Becker Bingham LLP

(57) ABSTRACT

A translation system and related methods are described. The translation system comprises a translation server computer and a user computer, such as a mobile device. The translation server computer is programmed to allow the user computer to dynamically update translations for electronic resources displayed by a computer program, such as a mobile app, without having to download new versions of the computer program. The user computer is configured to accept suggested translations for specific electronic resources, submit them to the translation server computer for approval, and subsequently display approved translations for the specific electronic resources.

20 Claims, 8 Drawing Sheets

(56) References Cited

U.S. PATENT DOCUMENTS

| | | |
|---|---|---|
| 2008/0195377 A1 | 8/2008 | Kato |
| 2009/0164494 A1 | 6/2009 | Dodin |
| 2010/0100369 A1 | 4/2010 | Shetty |
| 2010/0211377 A1 | 8/2010 | Aoyama |
| 2011/0144972 A1 | 6/2011 | Koenig |
| 2011/0179073 A1 | 7/2011 | Nilsson |
| 2012/0109625 A1 | 5/2012 | Luo |
| 2012/0109631 A1 | 5/2012 | Gopal |
| 2013/0086224 A1 | 4/2013 | Teraguchi |
| 2014/0033097 A1 | 1/2014 | Chiang |
| 2015/0039287 A1 | 2/2015 | Han |
| 2015/0186132 A1 | 7/2015 | Oliveri |
| 2017/0322944 A1 | 11/2017 | Farr |
| 2018/0232365 A1 | 8/2018 | Chang |
| 2018/0232366 A1 | 8/2018 | Chang |

OTHER PUBLICATIONS

Farr, U.S. Appl. No. 15/150,197, filed May 9, 2016, Notice of Allowance, dated Oct. 16, 2018.
Farr, U.S. Appl. No. 15/150,197, filed May 9, 2016, Interview Summary, dated Sep. 27, 2018.
Farr, U.S. Appl. No. 15/150,197, filed May 9, 2016, Office Action, dated Jun. 14, 2018.

\* cited by examiner

DYNAMIC UPDATE OF TRANSLATIONS FOR ELECTRONIC RESOURCES

TECHNICAL FIELD

The present disclosure generally relates to providing updated translations for electronic resources, such as application computer programs that are used with mobile computing devices and two or more different languages. The disclosure relates more specifically to dynamically providing updated translations for customized presentation of electronic resources.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The Internet promotes global communication. A computer application available on the Web, such as a mobile app, could be downloaded by user computers, such as mobile devices, located in a large number of geographic regions. Certain operating systems may offer native support for localization. Application developers are encouraged to take advantage of such native support to make their applications available in as many languages as possible.

Typically, an application developer can create, for each desired language, a translation for each of the electronic resources—text strings, sounds, graphics, etc. to be presented to a user—in his or her application and store these translations in a specific format, such as an XML, file. The developer can then package these translations together with a computer program as his or her application for download. Each download to a user computer creates a specific instance of the application, storing the translations in specific locations on the user computer. Upon execution, the specific instance can rely on the operating system running on the user computer to load the translation for a chosen language from one of the specific locations.

However, the translations prepared by the application developer could come short under certain circumstances. For example, those translations may be inadequate when organizations prefer internal jargon to standard terms. Furthermore, proper translations may be missing for specialized or fast-moving industries. On the other hand, different users might desire updated translations for different portions of the electronic resources, or different translations even for the same portion of the electronic resources in the same language. It could be a challenge to properly manage the translations in meeting the diverse needs of all the users.

DETAILED DESCRIPTION

Figure 1:
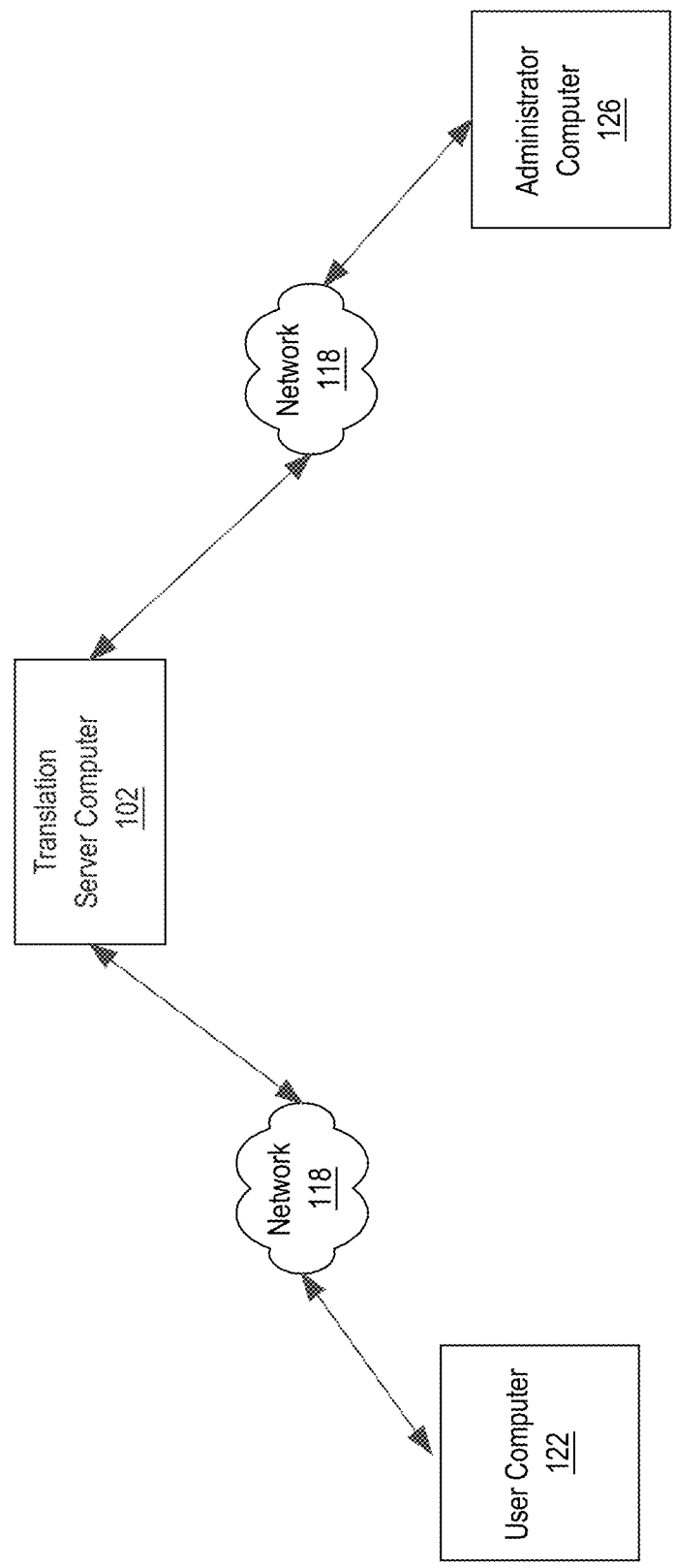
FIG. 1 illustrates an example networked computer system in which various embodiments may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described in sections below according to the following outline:
GENERAL OVERVIEW
EXAMPLE COMPUTING ENVIRONMENT
EXAMPLE SYSTEMS AND METHODS
UPLOAD AND DOWNLOAD OF MOBILE APP
INITIAL LAUNCH OF MOBILE APP
INPUTTING SUGGESTED TRANSLATION FOR ELECTRONIC RESOURCE
SUBMISSION OF SUGGESTED TRANSLATION TO SERVER
EVALUATION OF SUGGESTED TRANSLATIONS
INCORPORATION OF APPROVED TRANSLATION
EXAMPLE PROCESSES
IMPLEMENTATION EXAMPLE—HARDWARE OVERVIEW
OTHER ASPECTS OF DISCLOSURE General Overview This disclosure relates to a translation system and related methods where a translation server computer ("server") allows the display by a user computer, such as a mobile device, of desirable translations for electronic resources in a customized and efficient manner. In some embodiments, the server would manage default translations for a set of electronic resources utilized by a computer application in different languages as well as suggested translations submitted by different user computers for subsets of the electronic resources in one or more databases. A user computer having downloaded an instance of the computer application would have a copy of the default translations. The user computer would also manage a list of electronic resources for which suggested translations have been provided by a user of the user computer as well as approved translations for the list of electronic resources in one or more databases.

In some embodiments, in executing the computer application, the user computer can initially display the default translations in a chosen language, accept a suggested translation for one of the electronic resources in that chosen language, and submit the suggested translation to the server for approval. The server can find approval and add the suggested translation to its databases. Subsequently, upon every launch of the computer application, the user computer can retrieve from the server the latest translations that have been approved for the electronic resources for which suggested translations have been provided by a user of the user computer. Next, for those electronic resources for which no suggested translations have been provided, the user computer can display the default translations. For those electronic resources for which suggested translations have been provided, the user computer can display the latest approved translations.

The translation system and related methods produce many technical benefits, as discussed throughout this application. First, the system and methods allow utilization of the latest updated translations by a user computer for electronic resources displayed through a computer application, such as a mobile app, while an instance of the computer application is running. In other words, the latest updated translations can be obtained and utilized without an update of the entire computer application, such as a download of a newer version of the computer application. This first feature thus enables early and lightweight retrieval of updated translations, leading to a higher computational speed to achieve user objectives and reduced network transmission. Second, the system and methods enable each user computer to offer a customized presentation of the electronic resources, displaying updated translations in certain languages for only those electronic resources for which a user of the user computer has requested updated translations, while displaying default translations initially obtained for the other electronic resources together with the computer program. This second feature further leads to reduced network transmission and increased user satisfaction.

Third, the system and methods allow sharing of contributions made by different user computers and allow one user computer to benefit from a suggested translation submitted by another user computer. This third feature therefore enables faster production of updated translations and production of updated translations having better quality, also leading to improved computational speed to achieve user objectives and improved user satisfaction.

Fourth, the system and methods promote utilization of published application programming interface provided by common operating systems, such as the TextView Class offered by Android, without reinventing the wheel. Furthermore, they resolve one or more issues to which no previous solutions are known, including the issue related to identifying electronic resources as mapped to default translations in compilations generated by common operating systems. This fourth feature thus helps reduce computer programming requirements and uncertainty in the level of quality of the resulting computer program product, while offering a new solution to an issue presented by the common operating systems.

In some embodiments, a method of dynamically updating translations for an electronic resource implemented through a computer application by a processor is disclosed. The method comprises receiving, by the processor, an updated translation in a first of a plurality of languages for a first of a plurality of electronic resources from a remote server over a communication network, during execution of the computer application; storing, by the processor, a record of receiving the updated translation in the first language for the first electronic resource in a first local database; and determining whether an updated translation in a second of the plurality of languages for a second of the plurality of electronic resources previously received from the remote server exists in the first local database. The method further comprises, when an updated translation in the second language for the second electronic resource previously received from the remote server exists in the first local database, displaying the updated translation. The method additional comprises, when no updated translation in the second language for the second electronic resource previously received from the remote server exists in the first local database, retrieving a default translation in the second language for the second electronic resource from a second local database, the default translation downloaded from the remote server as part of the computer application; and displaying the default translation.

In some embodiments, a computer-implemented method of dynamically updating translations for an electronic resource is disclosed. The method comprises transmitting, by a processor, a computer application comprising a plurality of default translations respectively for a plurality of electronic resources for each of a plurality of languages and a computer program, to a plurality of remote user computers over one or more communication networks; receiving a first request to replace an existing translation in a first of the plurality of languages for a first of the plurality of electronic resources with a suggested translation from one of the plurality of user computers, during execution of the computer application by the one user computer; storing a first record based on the first request in a first local database; generating a first approved translation in the first language for the first electronic resource in response to the first request; storing a second record based on the first approved translation in the second local database; and transmitting a second approved translation to the one user computer, during execution of the computer application.

Example Computing Environment

FIG. 1 illustrates an example networked computer system in which various embodiments may be practiced. FIG. 1 is shown in simplified, schematic format for purposes of illustrating a clear example and other embodiments may include additional or different elements.

In some embodiments, a computer network system 100 comprises a translation server computer ("server") 102, one or more user computers 122, and one or more administrator computers 126 ("admin computer"), which are communicatively coupled directly or indirectly via one or more networks 118. The different components of the computer network system 100 can reside in the same or different computer network domains. For illustration purposes, the following discussions are focused on mobile devices and mobile apps, but the discussed embodiments are applicable to other types of user computers and computer applications.

The server 102 broadly represents one or more computers, virtual computing instances, and/or instances of a server-based application that is programmed to host or execute functions of a translation server computer including but not limited to managing data related to translations for electronic resources, mobile devices, mobile apps, or users and communications with user computers and admin computers. The server 102 can comprise a server farm, a cloud computing platform, a parallel computer, or any other computing facility with sufficient computing power in data processing, data storage, and network communication for the above-described functions.

A user computer 122 or an administrator computer 126 may comprise a desktop computer, laptop computer, tablet computer, smartphone, wearable device, or any other type of computing device that is capable of proper communication with the server 102 as well as adequate local data processing and storage. An administrator computer 126 may also be integrated into the server 102.

The networks 118 may be implemented by any medium or mechanism that provides for the exchange of data between the various elements of FIG. 1. Examples of network 118 include, without limitation, one or more of a cellular network, communicatively coupled with a data connection to the computing devices over a cellular antenna, a near-field communication (NFC) network, a Local Area Network (LAN), a Wide Area Network (WAN), the Internet, a terrestrial or satellite link, etc.

In some embodiments, an admin computer 126, which can belong to a developer of a mobile app, can upload the mobile app to the server 102. The mobile app can include default translations for a set of electronic resources presented by the mobile app in a set of desirable languages. A user computer 122, which can be a mobile device of a user, can then download the mobile app from the server 102 in accordance with an instruction of a user.

In some embodiments, in executing the mobile app, the user computer 122 can receive a request from the user to replace the current translation for a specific electronic resource managed by the mobile app by a suggested translation. The user computer 122 can keep a record of this request in a database and forward the request to the server 102. The server 102 can store the suggested translation in a queue for approval by an admin computer 126. The admin computer 126 can then review the items in the queue and communicate to the server 102 an approved or rejected status for each of the items. In response to receiving an approval of the suggested translation, the server 102 can then add the suggested translation to a database.

In some embodiments, in the next launch of the mobile app, the user computer 122 can then retrieve any latest approved translation for the specific electronic resource from the server 102. If a latest approved translation exists, which can be the translation suggested by the user or another translation suggested by another user, the user computer 122 can display that translation for the specific electronic resource. If no latest approved translation exists, which would mean that the translation suggested by the user was not approved, the user computer 122 can display the default translation.

Example Systems and Methods

Figure 2:
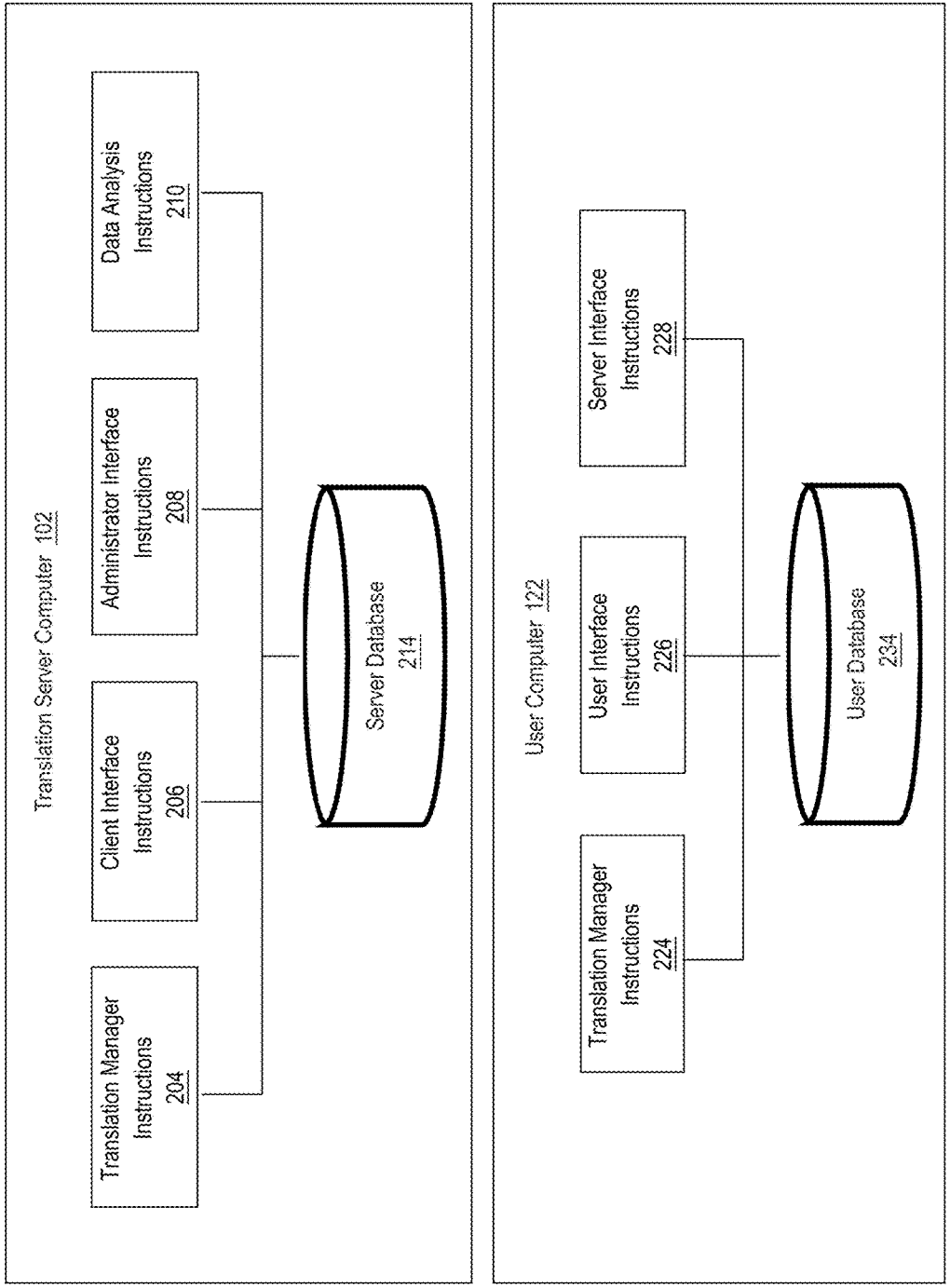
FIG. 2 illustrates example components of a server and example components of a user computer.

FIG. 2 illustrates example components of a server and example components of a user computer.

In some embodiments, the server 102 can comprise a translation manager component 204, a client interface component 206, an administrator interface component 208, and a data analysis component 210. The server 102 also can comprise one or more server databases 214.

A user computer 122 can comprise a translation manager component 224, a user interface component 226, and a server interface component 228. The user computer 122 can also comprise one or more user databases 234.

The diagrams are provided only to illustrate examples, and the server 102 or the user computer 122 can comprise fewer or more functional or storage components. Each of the functional components can be implemented as software components, general or specific-purpose hardware components, firmware components, or any combination thereof. A storage component can be implemented using any of relational databases, object databases, flat file systems or JSON stores. A storage component can be connected to the functional components locally or through the networks using programmatic calls, remote procedure call (RPC) facilities or a messaging bus. A component may or may not be self-contained. Depending upon implementation-specific or other considerations, the components may be centralized or distributed functionally or physically.

The translation manager component 204 of the server 102 is programmed or configured for managing translations for electronic resources presented by a mobile app. The translations can include default translations provided by the developer of the mobile app, as well as suggested translations provided by users of the mobile app. The client interface component 206 is programmed or configured for interfacing with a user computer 122. The interfacing can involve receiving a request to download an original or updated version or of the mobile app, providing access to certain versions of the mobile app, receiving a request to replace a default translation for a certain electronic resource with a suggested translation, or providing access to approved translations for certain electronic resources.

The administrator interface component 208 is programmed or configured for interfacing with an admin computer 126. The interface can involve receiving different versions of the mobile app, sending or receiving a request to review suggested translations in a queue, providing access to the queue, or receiving review decisions in terms of approval or denial.

The data analysis component 210 is programmed or configured for performing analysis related to the translations and reporting analysis results. For example, translation data can be analyzed to determine which translations for specific electronic resources are popular, for which electronic resources default translations deviate much from suggested translations, which languages or geographical regions are associated with more suggested translations.

Figure 3:
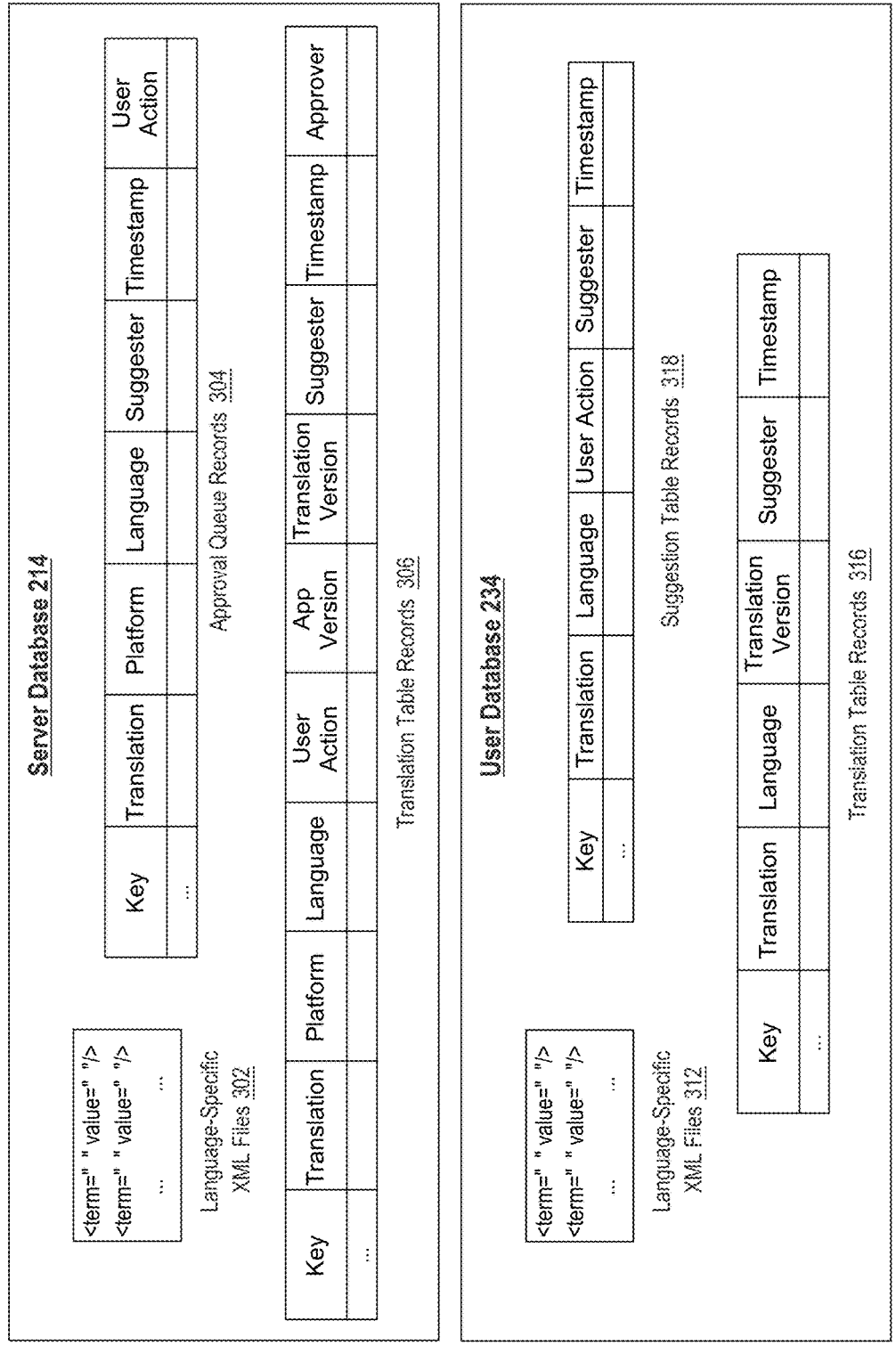
FIG. 3 illustrates example databases managed by the server and example databases managed by a user computer.

The server database 214 stores data related to users, administrators, default translations, suggested translations for approval, approved translations, and so on, as further discussed in FIG. 3.

The translation manager component 324 of a user computer 122 is programmed or configured for managing translations for electronic resources presented by a mobile app. The translations can include default translations provided by the developer of the mobile app, as well as translations suggested by a user of the user computer. The user interface component is programmed or configured for interfacing with the user. The interfacing can involve displaying appropriate translations for the electronic resources through the mobile app or receiving a suggested translation for a particular electronic resource from the user.

The server interface component 226 is programmed or configured for interfacing with the server 102. The interfacing can involve sending a request to download an original or updated version or of the mobile app, downloading certain versions of the mobile app, sending a request to replace the current translation for a certain electronic resource by a translation suggested by the user, or receiving approved translations for certain electronic resources. The user database 234 stores data related to the user, default translations, translations suggested for certain electronic resources by the user, approved translations for the certain electronic resources, and so on, as further discussed in FIG. 3.

Upload and Download of Mobile App

In some embodiments, the server 102 is programmed or configured with data structures and/or database records that are arranged to receive a mobile app from an admin computer 126 over a communication network. The mobile app can manage a set of electronic resources for presentation, including text strings. The mobile app can further include a set of default translations respectively for the set of electronic resources in each desired human-readable language, such as French or Chinese.

In addition, each set of default translations can be specific to an operating system on which the mobile app is to be executed. For some operating systems, such as Android, the set of default translations for text strings in each human-understandable language is represented by an XML file and packaged with the executable portion of the mobile app. Specifically, certain electronic resources, such as standalone text strings or text strings embedded in other electronic resources, are mapped to text strings in a specific language in the XML file.

The server 102 can be programmed or configured to extract the sets of default translations from the mobile app, or the server 102 can manage suggested and approved translations only. FIG. 3 illustrates example databases managed by the server and example databases managed by a user computer. The server 102 can be programmed or configured to save the XML files 302, for example, in the server database 214. Subsequently, the server 102 can be programmed or configured to receive a newer version of the mobile app from the admin computer 126 from time to time. The admin computer 126 can also be programmed to manage the download directly without uploading the mobile app to the server 102.

In some embodiments, the server 102 is programmed or configured to receive a request to download the mobile app from a user computer 122 over a communication network and allow the transmission of an instance of the current version of the mobile app ("user instance") to the user computer 122. Subsequently, the server 102 is programmed or configured to notify the user computer 122 when a newer version of the mobile app is available, in response to which the user computer 122 is programmed or configured to download the newer version. The server 102 can also be programmed to receive a request from the user computer 122 to redownload a particular version of the mobile app.

In some embodiments, the user computer 122 is programmed or configured with data structures and/or database records that are arranged to install the user instance, including storing the sets of default translations in a database, such as the XML files 312 in the client database 234.

Initial Launch of Mobile App

In some embodiments, in response to an instruction of a user, the user computer 122 is programmed or configured to launch the user instance for the first time. Upon the initial launch, the user computer 122 is programmed or configured to prompt the user to enter user information, which can enable the user instance to set up an account for the user and distinguish the user from other individuals running the user instance and other individuals running other instances of the mobile app.

In some embodiments, the user computer 122 is programmed or configured to set a default human-understandable language based on one or more factors, such as the anticipated location of sale. The user computer 122 can also be programmed to make the user's current location available to the user instance, which can then automatically select a human-readable language for the user. The user computer 122 can also be programmed by the user instance to prompt the user to select a language.

In some embodiments, the user computer 122 is programmed or configured to access the default translations packaged with the mobile app at one or more points in executing the mobile app. The default translations can be accessed once and converted into database records for future access. The default translations can also be accessed each time the electronic resources need to be presented. For example, on Android, the default TextView class for presenting a text string would access the appropriate XML files 312 for the selected language.

Inputting Suggested Translation for Electronic Resource

In some embodiments, the user computer 122 is programmed or configured to allow a user to suggest a translation for one or more of the set of electronic resources in accordance with the user instance. For example, the developer might intend for the translations for specific legal language presented by the mobile app to be fixed but for the translations for other application-level text strings to be editable. Furthermore, the developer might intend for the translations for only key terms to be editable, not for every possible concatenation of adjacent text strings in sentences presented by the mobile app to be editable.

Figure 4:
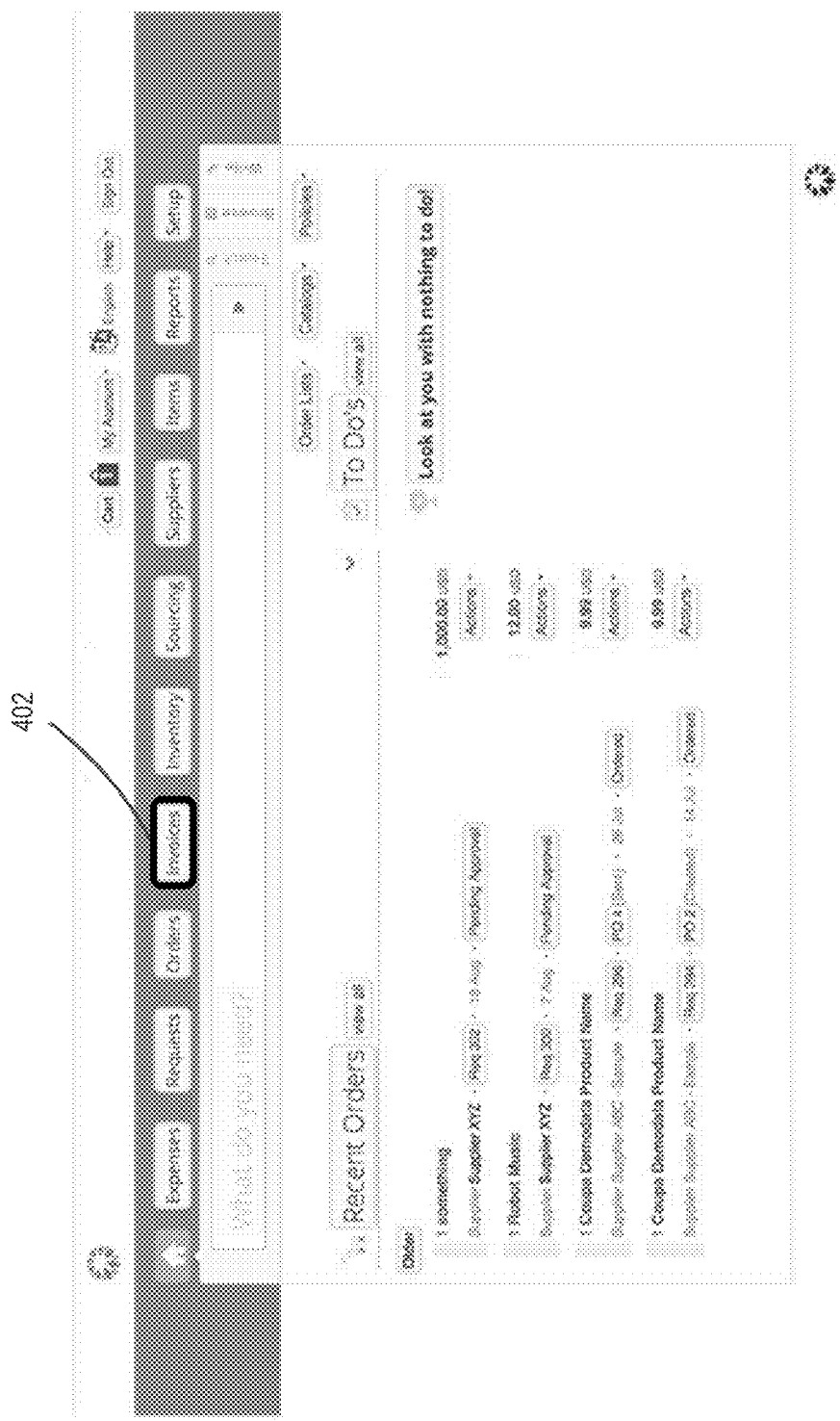
FIG. 4 illustrates an example graphical user interface of a computer application, where the visual representations of electronic resources for which suggested translations are acceptable are highlighted.

FIG. 4 illustrates an example graphical user interface of a computer application, where the visual representations of electronic resources for which suggested translations are acceptable are highlighted. In this example, the visual representation for the button containing the text "Invoices" 402 on the menu bar is shown with a thick rim to illustrate such highlighting. Those visual representations can also be highlighted in other ways, such as shown in different colors or fonts. Such highlights are signals to the user that updated translations for these electronic resources can be accepted by interaction with the visual representations.

In some embodiments, the user computer 122 is programmed or configured to detect the intention to suggest a translation for an electronic resource in a variety of ways. For example, a user can click or double-click on a visual representation of the electronic resource, click-and-hold (long-click) the visual representation, touch or double-touch the visual representation, and so on. In one implementation, on the Android operating system, the TextView class for presenting a text string includes a number of programmatic listen-respond methods (listeners) for user interaction with the visual representation of the text string, including performLongClick or onTouchEvent, which can be overridden for the developer's purposes. Other mobile computing operating systems, such as APPLE IOS, may provide similar methods, functions or operating system primitives that can be programmatically overridden in a functionally equivalent manner, and embodiments are not limited to use of TextView overrides on Android. Alternatively, the user computer 122 can be programmed to enable selection of an option for suggesting a translation without any reference to a presented electronic resource, subsequent specification of the electronic resource, and input of a suggested translation for the electronic resource if the translation for electronic resource is editable.

Figure 5:
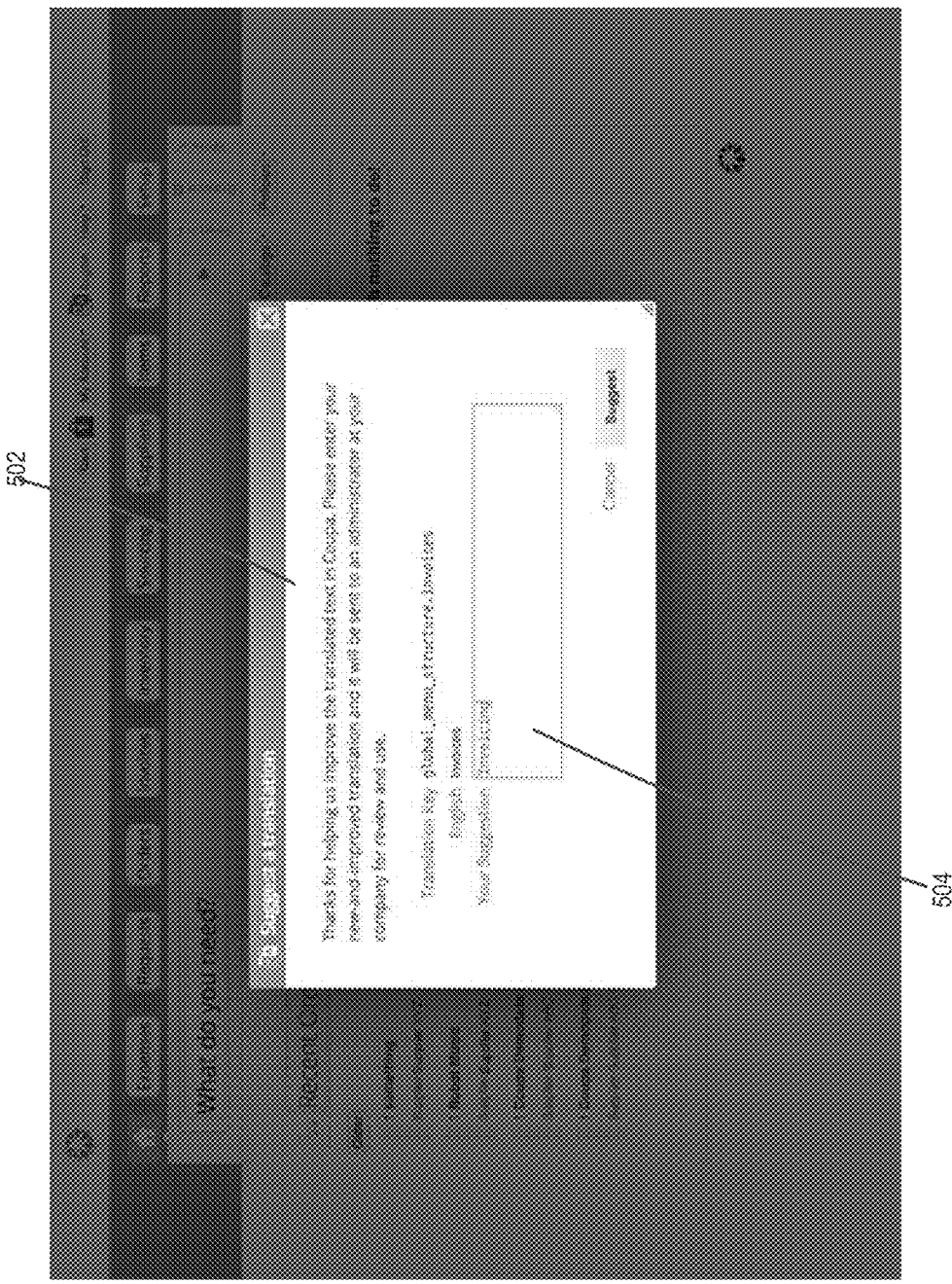
FIG. 5 illustrates an example graphical user interface of a computer application, including a dialogue for accepting a suggested translation.

FIG. 5 illustrates an example graphical user interface of a computer application, including a dialogue for accepting a suggested translation. In some embodiments, upon detecting a preselected event, the user computer 122, through any of these listeners, is programmed or configured to enable the user to provide a suggested translation. For example, if the user would like to suggest a translation for the text string "Invoices" 402, the user can long-click on the visual representation of the text string, and the user computer 122 can be programmed to present a modal dialogue 502 in response, where the user can input the suggested translation in the text field 504. Specifically, the dialog can indicate an internal programmic name for the electronic resource, such as "global_menu_structure.invoices", the current language, such as "English", and the current translation for the electronic resource, such as "Invoices". The user can then provide an updated translation, such as "Invoicing".

Submission of Suggested Translation to Server

In some embodiments, the user computer 122 is programmed or configured to keep track of suggested translations in accordance with the user instance. For example, in response to a suggested translation in a specific language for a specific electronic resource, the user computer 122 can be configured to store a record in a database, such as the suggestion table 318 in FIG. 3. The record can identify the specific electronic resource as the key of the record. On Android, for example, each electronic resource indicated in an XML file for translation purposes would be assigned a number by the operating system, and the number assigned to the same electronic resource can vary from one compilation of the mobile app to the next. Consequently, such an assigned number cannot be used as a key in the suggestion table 318 or other database structures storing the translations for use across multiple compilations or versions of the mobile app.

To resolve this issue to which no previous solution is known, the user computer 122 can be programmed or configured to use the default translation also indicated in the XML file to identify the specific electronic resource in the suggestion table 318 or other database structures storing the translations. In addition, the record can include the suggested translation and the corresponding language. The record can also identify the user who suggested the translation ("suggester"), and indicate the user interface action used to indicated an intent to suggest a translation or the time when the suggestion was made.

Furthermore, while the default behavior may be to use the same translation for all instances of the same electronic resource presented in different locations by the mobile app, the record can include a location of the visual representation for the electronic resource that has been associated with a GUI event, to enable the update of a translation for only that instance of the electronic resource. More generally, a record as stored in the suggestion table 318 can include fewer or more than the above-noted fields, and different sets of records could be stored in different queues or database tables. For example, different tables can be used for different languages or different users. Keeping track of the suggestion history enables the user computer 122 to present customized views to the users of the user computer 122 by displaying updated translations only for the electronic resources for which translations have been suggested by those users.

In some embodiments, the user computer 122 is then programmed or configured to send a request to the server 102 to update the translation for the specific electronic resource, for which an updated translation has been suggested by a user. The request can include at least a portion of the record created and stored in response to the suggested translation. The request can additionally include information identifying the user computer 122 and the operating system or platform of the user computer 122, including a version of the operating system.

In some embodiments, in response to the request from the user computer 122, the server 102 is programmed or configured to store a record for the request in a database for approval, such as one or more approval queues 304 in FIG. 3. The record can contain the information included in the request, such as an identification of the electronic resource via the default translation, a suggested translation, the corresponding language, an identification of the user or account that made the suggestion, or a description of the user interface event that led to the suggestion. The record can also identify the user computer 122, including the operation system running on the user computer 122, and indicate the time the request was received. More generally, the record as stored in the approval queue 304 can include fewer or more than the above-noted fields, and different sets of records could be stored in different queues or database tables. For example, different tables can be used for different languages or different operating systems.

Evaluation of Suggested Translations

In some embodiments, the server 102 is programmed or configured to send a notification to an admin computer 126 that new suggested translations are available for review. The notification can be sent as soon as requests to update the translations are received, when a certain amount of the approval queue's capacity is reached, or based on some other predetermined schedule. The notification can also include various statistics on the new and past suggested translations to assist in the review process. In addition, the notification be sent together with one or more suggested translations for approval. Alternatively, access to the suggested translations can be given in response to requests received from the admin computer 126 to gain access to the suggested translations.

In some embodiments, the server can allow the admin computer 126 to carry out the review process through a graphical user interface, which is available to a user of the admin computer 126 only based upon the user's role as an administrator. The graphical user interface can offer various options to assist in the review. For example, the user may sort, search, or filter suggested translations by keyword, location, translation key, current translation, type of user who created the suggestion, or any combination thereof.

In some embodiments, the server 102 is programmed to receive a review decision for each suggested translation in terms of whether the suggested translation is approved or rejected. In addition, the server 102 is configured to remove the reviewed items from the database, such as the approval queue 304.

In some embodiments, the server 102 is programmed or configured to automatically determine whether to approve or reject a suggested translation. For example, the server 102 can be programmed to approve the translation suggested most often for a specific electronic resource across different users, or to reject all suggested translations for a specific electronic resource unless the total number of suggested translations exceeds a predetermined threshold. The ease of approval or rejection could vary depending on the characteristics of the electronic resources, languages, or suggesters. For example, those electronic resources deemed to be more specialized or newer, those target languages deemed to be more different from the source languages, and those suggesters deemed to have more linguistic expertise might be associated with a higher rate of approval. The server 102 can also be configured to learn from past review histories of the admin computer 126 to associate the characteristics of electronic resources, languages, or suggesters with approval or rejection decisions, using machine learning techniques known to someone of ordinary skill in the art.

In some embodiments, the server 102 is programmed or configured to store a record for each approved translation into a database, as the translation table 306 in FIG. 3. The record would identify a specific electronic resource and include the approved translation. The record can also contain at least some of the information contained in a record of the approval queue 304, and it can contain additional information. For example, the record can identify the corresponding language and the operating system, including a version of the operating system. The record can identify the user who originally suggested the approved translation and describe the user interface event that led to the suggested translation. The record can also include a version number that increases for each approved suggested translation for a specific electronic resource. In addition, the record could also identify the party who approved the suggested translation and the time of approval. More generally, a record as stored in the translation table 306 can include fewer or more than the above-noted fields, and different sets of records could be stored in different database tables. For example, different tables can be used for different languages, different operating systems, or different approvers. Such database records enable the server 102 to distribute appropriate approved translations to different user computers 122 and also to extract different pieces of intelligence through learning activities. In learning how to determine whether to approve or reject suggested translations, as discussed above, the server 102 can also be programmed or configured to compute various statistics related to any of the fields in the database tables for reporting and further analysis purposes.

In some embodiments, the server 102 is programmed or configured to receive instructions from the admin computer 126 regarding the propagation or update of approved translations and implement such instructions in the databases. For example, by default, an approved translation for a specific electronic resource can be applied to all instances of the electronic resource presented by the mobile app and all instances of the mobile app running by the same or different users on the same or different user computer 122s which have requested an update of the translation for the specific electronic resource. Instead, the instructions can indicate that the application is limited to only the specific instances of the electronic resource that are associated with user interface events, or only the user computers 122 which submitted suggested translations for the specific electronic resource, which are located in a particular geographical region, or which are associated with a particular group of users.

The instructions can also indicate that the approved translation is effective for only a particular period of time or only those instances of the mobile app associated with a specific app version number. The instruction can also indicate that the approved translation can be retrieved not only upon a launch of the mobile app but also during execution of the mobile app in response to a page refresh or other user interface events. Furthermore, the instructions could revert approved translations by replacing the current version of approved translation for a specific electronic resource with an earlier version.

Incorporation of Approved Translation

In some embodiments, the server 102 is programmed or configured to send a response to the request from the user computer 122 to update the translation for the specific electronic resource with the suggested translation. The response can be a notification of the review status in terms of approval or rejection. The response can also include the latest approved translation for the specific electronic resource, which may or may not be the suggested translation included in the request—another translation suggested by a different user of the same or a different user computer 122 may have been submitted and approved. The server 102 can be programmed to send the response as soon as a decision on the suggested translation is available, when approved translations are available for a predetermined number of electronic resources for which requests to update the translations were received from the user computer 122, or based on some other predetermined schedule.

In some embodiments, the user computer 122 is programmed or configured to retrieve approved translations for one or more electronic resources from the server 102. The retrieval can be performed at every launch of the user instance, a predetermined amount of time after the request to update a translation was made, upon a user request, or based on another predetermined schedule. The retrieval can be performed by sending a request to the server 102. The retrieval can be further performed by receiving one or more approved translations from the server 102, or receiving access to the server database 214 and transmitting one or more approved translations from the server 102. The retrieval can be limited to only the current versions of approved translations for those electronic resources for which requests to update the translations were sent to the server 102 by the user computer 122, by referring to the suggestion table 318, for example.

Such retrieval enables the user computer 122 to display updated translations for only those electronic resources where previous versions of translations were not preferred by the user. The retrieval can also be broadened to the current versions of all the new approved translations for a specific language or simply all the new approved translations. Such flexible retrieval is not tied to the packaging of translations with the mobile app executable and thus not tied to a download of the entire mobile app.

In some embodiments, the server 102 is programmed or configured to store a record for each retrieved approved translation in the database, such as the translation table 316 in FIG. 3. The record could identify a specific electronic resource and include the approved translation newly retrieved from the server 102. The record can also contain at least some of the information contained in a record of the suggestion table 318, and it can contain additional information. For example, the record can identify the corresponding language and the user who suggested the translation. The record can also include a version number of the approved translation and the time of receiving the approved translation. More generally, the record stored in the translation table 316 can include fewer or more than the above-noted fields, and different sets of records could be stored in different database tables. For example, different tables can be used for different languages or different users.

In some embodiments, as the database of approved translations, such as the translation table 316, is built up, the user computer 122 is programmed or configured to display approved translations to a user. Specifically, for every electronic resource managed by the mobile app, the user computer 122 is programmed to determine whether any approved translation for the electronic resource exists in the database from previous retrieval. When such a approved translation does exist, typically the newest approved translation is displayed; otherwise, the default translation is displayed. The user computer 122 can also be programmed to display an older approved translation in response to a user request. On Android, for example, instead of just displaying the default translation included in the appropriate XML file for the chosen language, an overriding TextView class can look up the database first and display any approved translation from the database. By virtue of this feature, the display of updated translations does not need to wait until the default translations are updated in a new release of the mobile app.

Example Processes

Figure 6:
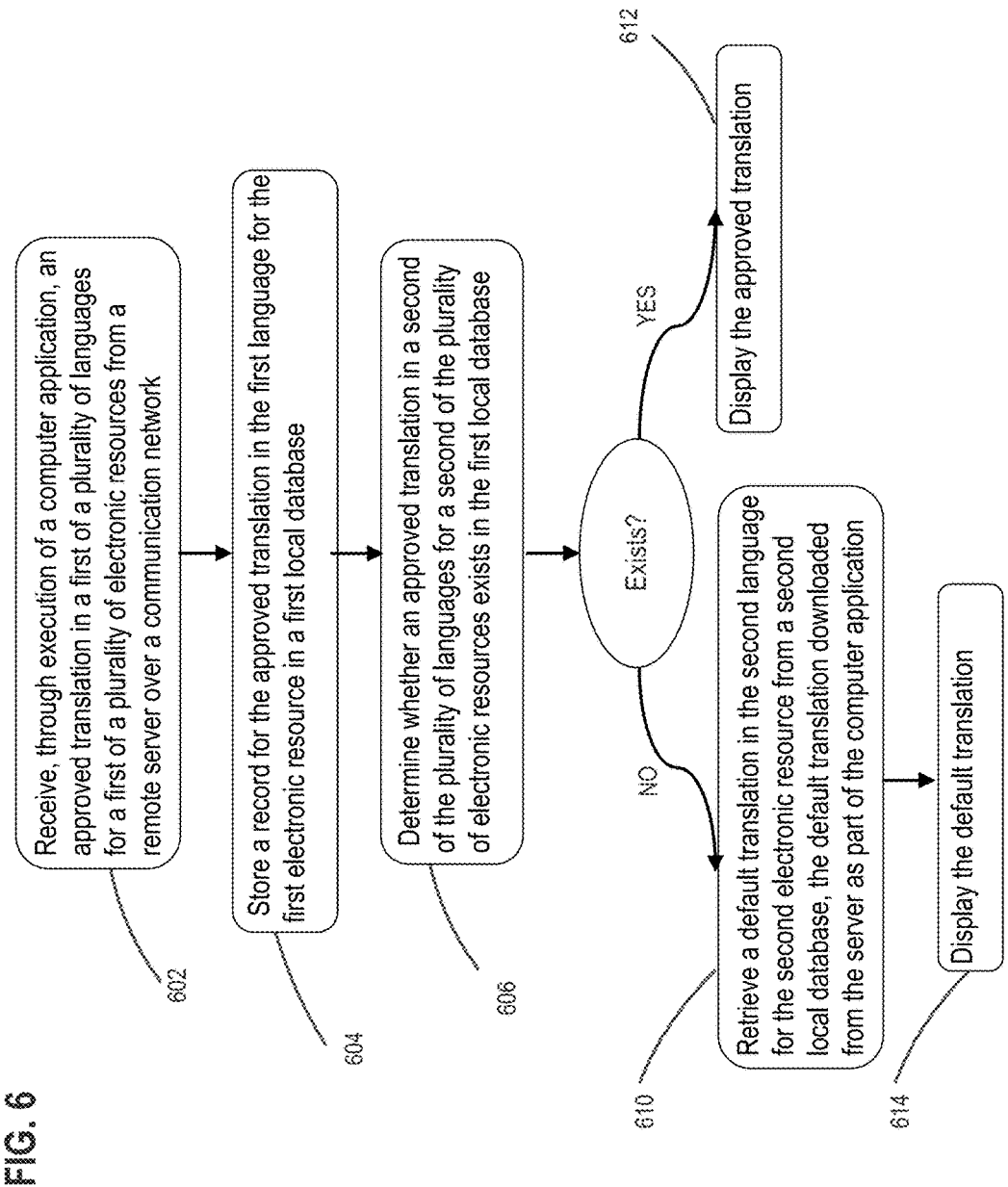
FIG. 6 illustrates an example process of dynamically updating translations for an electronic resource performed through a computer application by a user computer.
Figure 7:
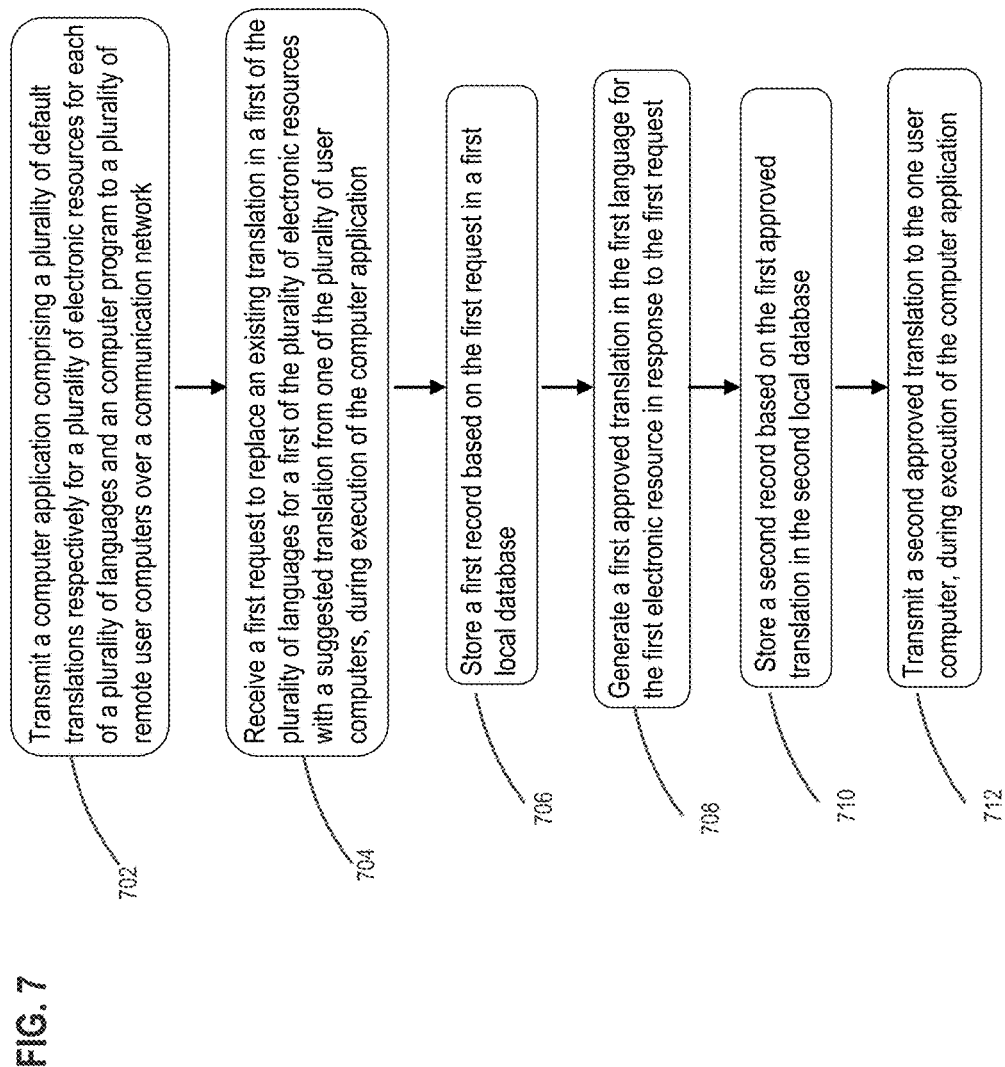
FIG. 7 illustrates an example process of dynamically updating translations for an electronic resource performed by the server.

FIG. 6 and FIG. 7 are each intended to disclose an algorithm, plan or outline that can be used to implement one or more computer programs or other software elements which when executed cause performing the functional improvements and technical advances that are described herein. Furthermore, each of the flow diagrams herein is described at the same level of detail that persons of ordinary skill in the art ordinarily use to communicate with one another about algorithms, plans, or specifications forming a basis of software programs that they plan to code or implement using their accumulated skill and knowledge.

FIG. 6 illustrates an example process of dynamically updating translations for an electronic resource performed through a computer application by a user computer. The computer application can be a mobile app and the user computer can be a mobile device. In some embodiments, the mobile device is programmed to initially download a user instance of the mobile app, including a plurality of default translations respectively for a plurality of electronic resources for each of a plurality of human-understandable languages. The electronic resources typically include text strings. The plurality of default translations can be represented as XML files, for example.

In step 602, the mobile device, upon each launch of the user instance, is programmed to contact the server to retrieve a set of newly approved translations from a server database, including an approved translation in a first language for a first electronic resource. The approved translations could be limited to the set of electronic resources for each of which a user of the mobile device has requested an update of the current translation displayed to the user. The approved translations can also be retrieved from the server database at various times during the execution of the user instance.

In step 604, the mobile device is configured to store a record for each approved translation received from the server in a first local database, so that these approved translations can be immediately displayed in the same execution of the user instance.

In some embodiments, in step 606, to display a translation in a certain language for a certain electronic resource, the mobile device is programmed to determine whether an approved translation in the certain language for the certain electronic resource exists in the first database.

When such an approved translation exists, in step 612, the mobile device is programmed to retrieve the approved translation from the first database and display the approved translation. This approved translation typically has the highest version number than the other approved translations in the certain language for the certain electronic that might also be in the first database.

When such an approved translation does not exist, in step 610, the mobile device is configured to retrieve the default translation in the certain language for the certain electronic resource, which might have been stored in a second database, and in step 614 display the default translation. By virtue of these features, the mobile device does not have to download a newer release of the mobile app in order to obtain newly approved translations. Furthermore, the mobile device can maintain a customized presentation of the mobile app in the chosen language by displaying approved translations for only those electronic resources where the current translations are not preferred by a user, and otherwise displaying the existing translations.

FIG. 7 illustrates an example process of dynamically updating translations for an electronic resource performed by the server.

In some embodiments, in step 702, the server is programmed or configured to initially transmit a user instance of a computer application, including a plurality of default translations respectively for a plurality of electronic resources for each of a plurality of human-understandable languages, to a user computer over a communication network, such as the Internet, or a cellular network. The computer application can be a mobile app, and the user computer can be a mobile device.

Subsequently, in step 704, the server is programmed to receive a request to replace an existing translation in a certain language for a certain electronic resource with a suggested translation from a mobile device through execution of the user instance. The request can include various types of information, such as information regarding the operating system running on the mobile device, the user providing the suggested translation, or the version of the user instance.

In step 706, the server is programmed to store a record for the request in a first database, such as an approval queue, so that this and/or other requests related to presenting the certain electronic resource in the certain language can undergo a systematic review process.

In some embodiments, in step 708, the server is programmed to generate an approved translation in the certain language for the certain electronic resource. The approved translation can be generated from a review of the requests in the approval queue by an administrator computer, from an automatic analysis of the requests, or a combination of both. For example, the administrator computer can be configured to provide an approval or rejection status for each of the suggested translation.

In step 710, the server is programmed to store a record for each approved translation in a second database, so that they can be distributed to the user instances running on various mobile devices.

In step 712, the server 102 is programmed to transmit an approved translation in the certain language for the certain electronic resource to the mobile device. The approved translation is typically the last approved translation in the certain language for the certain electronic resource, although the server 102 can be configured to receive additional instructions from the administrator computer to distribute older versions of approved translations instead.

Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
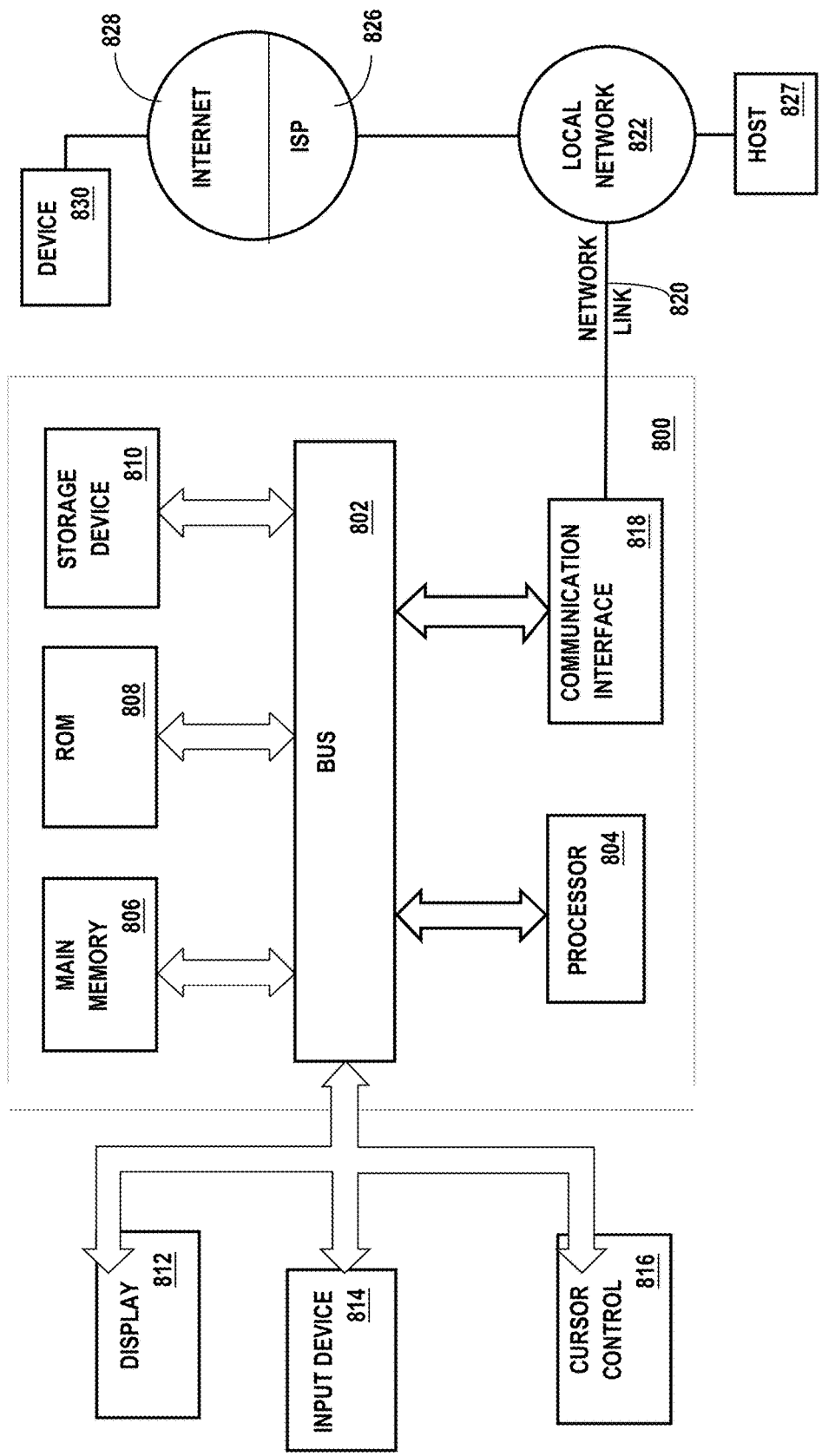
FIG. 8 is a block diagram that illustrates a computer system upon which an embodiment of the invention may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 827 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a device 830 might transmit a requested code for an application program through Internet 828, ISP 826, local network 822 and communication interface 818.

The received code may be executed by processor 804 as it is received, and/or stored in storage device 810, or other non-volatile storage for later execution.

Other Aspects of Disclosure

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A method of dynamically updating translations for an electronic resource implemented through a computer application by a processor, comprising:
    receiving, by the processor, a computer application comprising a computer program and default translations for a plurality of electronic resources in a plurality of languages from a remote server over a communication network;
    receiving, by the processor, an updated translation in a first of the plurality of languages for a first of the plurality of electronic resources separately without the computer program from the remote server over the communication network, during execution of the computer application;
    storing, by the processor, a record of receiving the updated translation in the first language for the first electronic resource in a first local database;
    determining whether an updated translation in a second of the plurality of languages for a second of the plurality of electronic resources previously received from the remote server exists in the first local database;
    when an updated translation in the second language for the second electronic resource previously received from the remote server exists in the first local database, causing a display of the updated translation;
    when no updated translation in the second language for the second electronic resource previously received from the remote server exists in the first local database, retrieving a default translation in the second language for the second electronic resource from a second local database;
        causing a display of the default translation in the second language.

2. The method of claim 1,
    the computer application being a mobile app executable on a mobile computing device,
    the first or second electronic resource including a text string.

3. The method of claim 2, executing the computer application being performed on the Android mobile platform and comprising executing a user-supplied TextView class, which includes a number of programmatic listen-respond methods for user interaction with a visual representation of a text string.

4. The method of claim 1, further comprising:
    receiving a suggestion to replace an existing translation in the first language displayed for the first electronic resource with a suggested translation;
    storing a record of receiving the suggestion in a second local database;
    submitting a request to replace the existing translation based on the stored record to the remote server;
    wherein receiving an updated translation is responsive to the submission.

5. The method of claim 4, the request including information regarding one or more of an operating system that manages execution of the computer application or a user who provided the suggestion.

6. The method of claim 4, the record including the default translation in the first language for the first electronic resource.

7. The method of claim 4, receiving a suggestion comprising detecting a graphical user interface (GUI) event related to the display of the existing translation.

8. The method of claim 7, the GUI event being one of a click, a long click, or a touch.

9. The method of claim 1, wherein a record of receiving a suggestion to replace an existing translation in the second language displayed for the second electronic resource exists in the second local database.

10. The method of claim 1, receiving an updated translation being responsive to sending a request for an updated translation in the first language for the first electronic resource to the remote server.

11. The method of claim 1, further comprising determining the first or the second language based on location information or user input.

12. A computer-implemented method of dynamically updating translations for an electronic resource, comprising:
    creating a plurality of default translations respectively for a plurality of electronic resources in a plurality of languages;
    transmitting, by a processor, a computer application comprising the plurality of default translations respectively for a plurality of electronic resources in each of the plurality of languages and a computer program, to a plurality of remote user computers over one or more communication networks;
    receiving a first request to replace an existing translation in a first of the plurality of languages for a first of the plurality of electronic resources with a suggested translation from one of the plurality of user computers, during execution of the computer application by the one user computer;
    storing a first record based on the first request in a first local database;
    generating a first approved translation in the first language for the first electronic resource in response to the first request;
    storing a second record based on the first approved translation in the second local database;
    transmitting a second approved translation separately without the computer program to the one user computer, during execution of the computer application.

13. The computer-implemented method of claim 12, the one user computer being a mobile computing device, and the computer application being a mobile app.

14. The computer-implemented method of claim 12, the first request including information regarding one or more of an operating system managing execution of the computer application and a user providing the suggested translation.

15. The computer-implemented method of claim 12, the first record or the second record including the default translation in the first language for the first electronic resource.

16. The computer-implemented method of claim 12, generating a first approved translation comprising receiving the first approved translation from a remote administrator computer.

17. The computer-implemented method of claim 12, generating a first approved translation comprising analyzing records in the first and second local databases and automatically selecting a translation as the first approved translation from the records in the first database.

18. The computer-implemented method of claim 12,
the second record including a version number associated with the approved translation in the first language for the first electronic resource,
the version number larger than any version number associated with an approved translation in the first language for the first electronic resource in the second database.

19. The computer-implemented method of claim 18, further comprising:
receiving an instruction to apply the second approved translation in the first language for the first electronic resource, the second approved translation having a specific version number,
wherein transmitting the second approved translation is responsive to the receiving the instruction.

20. The computer-implemented method of claim 12, further comprising:
receiving a second request from the one user computer for an approved translation in the first language for the first electronic resource;
transmitting a second approved translation being responsive to receiving the second request.

* * * * *